United States Patent
Nichols (10) Patent No.: US 10,199,054 B1
(45) Date of Patent: Feb. 5, 2019

(54) DATA STORAGE DEVICE MEASURING DIFFERENCE BETWEEN READ SIGNALS WHEN READING A PREAMBLE WITH MULTIPLE READ ELEMENTS

(71) Applicant: Western Digital Technologies, Inc., Irvine, CA (US)

(72) Inventor: Mark A. Nichols, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/728,749

(22) Filed: Oct. 10, 2017

(51) Int. Cl.
*G11B 5/012* (2006.01)
*G11B 19/02* (2006.01)
*G11B 5/09* (2006.01)
*G11B 20/10* (2006.01)
*G11B 19/00* (2006.01)

(52) U.S. Cl.
CPC .............. *G11B 5/012* (2013.01); *G11B 19/02* (2013.01); *G11B 5/09* (2013.01); *G11B 19/00* (2013.01); *G11B 20/10* (2013.01); *G11B 20/10305* (2013.01); *G11B 20/10388* (2013.01); *G11B 20/10472* (2013.01)

(58) Field of Classification Search
None
See application file for complete search history.

(56) References Cited

U.S. PATENT DOCUMENTS

| | | | |
|---|---|---|---|
| 8,908,305 B1* | 12/2014 | Jin | G11B 5/6011 360/31 |
| 9,019,642 B1* | 4/2015 | Xia | G11B 20/10009 360/25 |
| 9,082,418 B2 | 7/2015 | Ong et al. | |
| 9,196,298 B1* | 11/2015 | Zhang | G11B 5/4813 |
| 9,214,186 B1* | 12/2015 | Haralson | G11B 20/10305 |
| 9,318,137 B1* | 4/2016 | Chan | G11B 20/10009 |
| 9,437,242 B1 | 9/2016 | Banh et al. | |
| 9,672,853 B1* | 6/2017 | Oberg | G11B 5/59611 |
| 9,940,967 B1* | 4/2018 | French, Jr. | G11B 5/59694 |
| 9,972,349 B1* | 5/2018 | French, Jr. | G11B 5/012 |
| 2014/0139940 A1* | 5/2014 | Ong | G11B 5/012 360/39 |
| 2016/0225404 A1* | 8/2016 | Dziak | G11B 20/10481 |

* cited by examiner

*Primary Examiner* — Tan X Dinh (57) ABSTRACT

A data storage device is disclosed comprising a disk comprising a plurality of data tracks, wherein each data track comprises a plurality of data sectors, each data sector comprises a preamble, and the preambles of adjacent data tracks are recorded at different frequencies. A first read element and a second read element of a head are positioned over a first preamble of a first data track to generate a first read signal emanating from the first read element and a second read signal emanating from the second read element. A first metric is generated based on the first read signal and a second metric is generated based on the second read signal. A difference between the first metric and the second metric is generated and used, for example, to servo the head over the disk or to measure a radial offset between the read elements.

20 Claims, 7 Drawing Sheets

DATA STORAGE DEVICE MEASURING DIFFERENCE BETWEEN READ SIGNALS WHEN READING A PREAMBLE WITH MULTIPLE READ ELEMENTS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
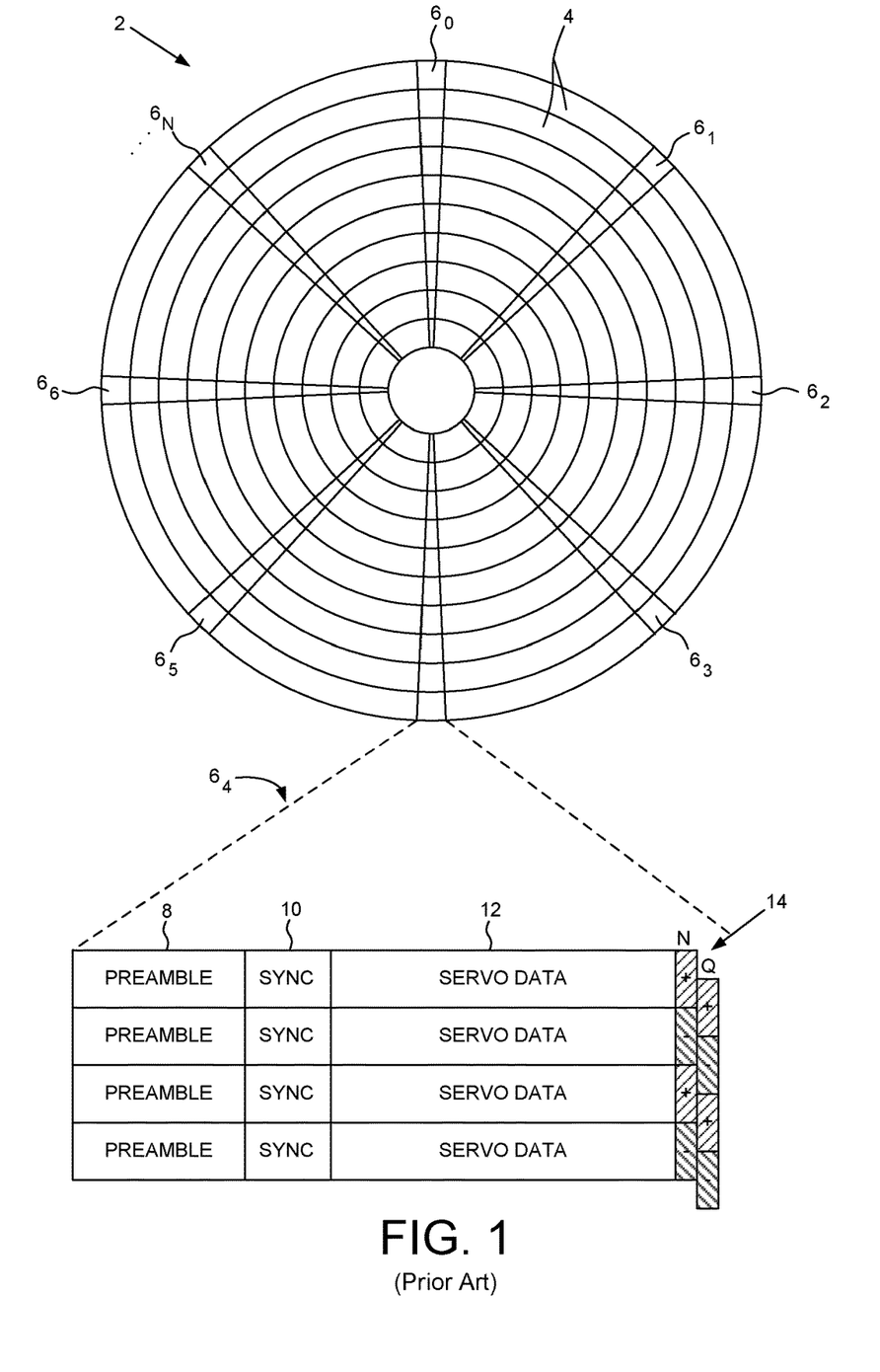
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6i further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
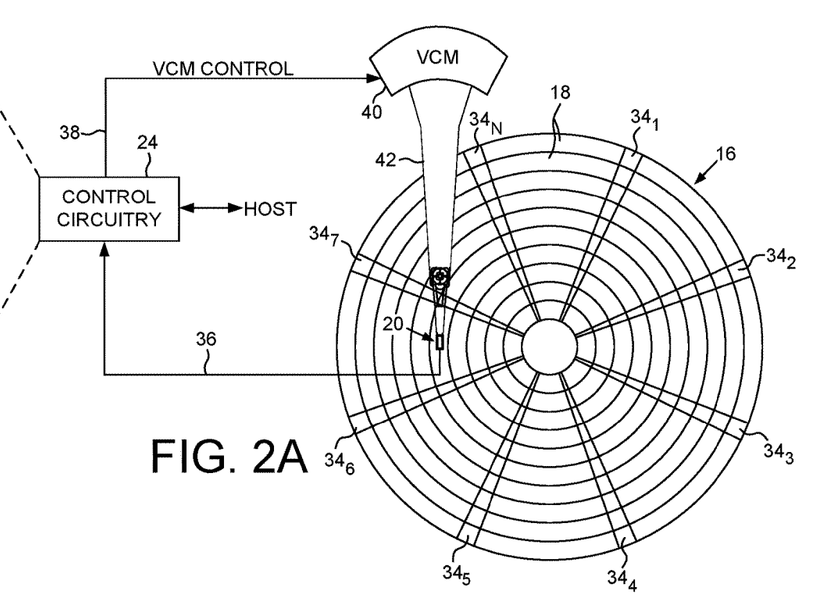
FIG. 2A shows a data storage device in the form of a disk drive according to an embodiment comprising a head actuated over a disk.
Figure 2B:
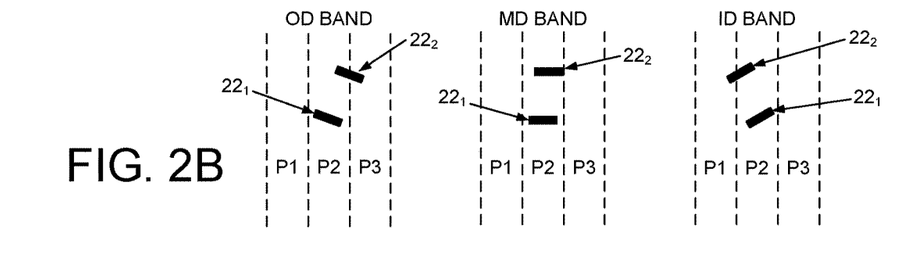
FIG. 2B shows an embodiment wherein the head comprises multiple read elements, including a first read element and a second read element.
Figure 2C:
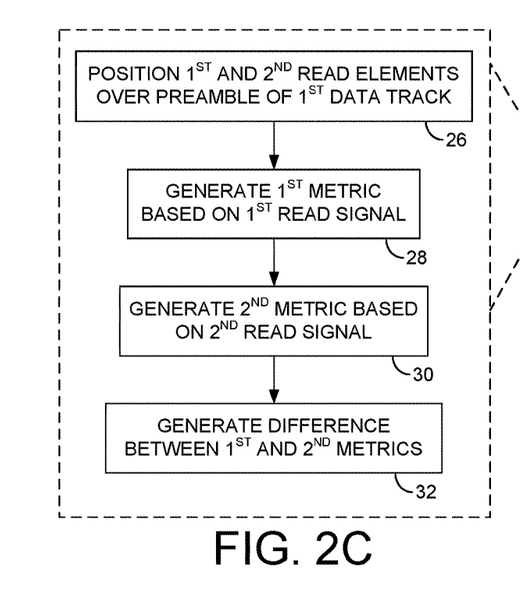
FIG. 2C is a flow diagram according to an embodiment wherein after positioning the read elements over the preamble of a data track, a metric is generated for each read signal and a difference is generated between the metrics.

FIG. 2A shows a data storage device in the form of a disk drive according to an embodiment comprising a disk 16 comprising a plurality of data tracks 18, wherein each data track 18 comprises a plurality of data sectors, each data sector comprises a preamble, and the preambles of adjacent data tracks are recorded at different frequencies. A head 20 is actuated over the disk 16, wherein the head 20 comprises a plurality of read elements including a first read element $22_1$ and a second read element $22_2$ (FIG. 2B). Control circuitry 24 is configured to execute the flow diagram of FIG. 2C, wherein the first read element and the second read element are positioned over a first preamble of a first data track to generate a first read signal emanating from the first read element and a second read signal emanating from the second read element (block 26). A first metric is generated based on the first read signal (block 28) and a second metric is generated based on the second read signal (block 30). A difference between the first metric and the second metric is generated (block 32) and used for any suitable purpose, such as servoing the head over the disk, or measuring a radial offset between the read elements.

In the embodiment of FIG. 2A, the disk 16 comprises a plurality of servo sectors $34_1$-$34_N$ that define servo tracks, wherein the servo sectors $34_1$-$34_N$ may comprise any suitable head position information, such as a track address for coarse positioning and servo bursts for fine positioning. The data tracks 18 may be defined relative to the servo tracks at the same or different radial density. The control circuitry 24 processes a read signal 36 emanating from the head 20 to demodulate the servo sectors $34_1$-$34_N$ and generate a position error signal (PES) representing an error between the actual position of the first head and a reference position relative to a target data track. A servo control system in the control circuitry 24 filters the PES using a suitable compensation filter to generate a control signal 38 applied to a voice coil motor (VCM) 40 which rotates an actuator arm 42 about a pivot in order to actuate the head 20 radially over the disk 16 in a direction that reduces the PES. The servo bursts may comprise any suitable pattern, such as an amplitude based servo pattern or a phase based servo pattern (FIG. 1).

In the embodiment of FIG. 2B, the preambles of the data sectors are recorded at different frequencies P1, P2, P3 which repeats after every third data track. Any suitable preamble frequencies may be employed, such as P1=2T, P2=4T and P3=6T preamble where "T" represents a bit period. In one embodiment, recording the data sector preambles at different frequencies ensures the metric generated for each read signal corresponds to the preamble of a target data track. For example, when the head 20 is positioned over the outer diameter band of tracks as shown in FIG. 2B so that the first read element $22_1$ is positioned over the center of the P2 preamble of a target data track, the second read element $22_2$ may be positioned partially over the P2 preamble of the target data track as well as partially over the P3 preamble of the adjacent data track. In one embodiment, the metric generated for each read signal is based on the frequency of the data sector preamble of the target data track, wherein in this example, the metric is generated based on the P2 preamble frequency. Any suitable metric may be generated, such as by computing a Discrete Fourier Transform (DFT) of the read signal samples at the target preamble frequency in order to measure the amplitude of the frequency component. In another embodiment, a preamble-signal-to-noise ratio (PSNR) may be measured at the target preamble frequency for each read signal. The PSNR for each read signal may be measured in any suitable manner, wherein in one embodiment, the PSNR may be the output of a continuous time filter which approximates the energy of a sinusoid matching the frequency of the preamble (e.g., 2T, 4T, 6T).

Figure 3A:
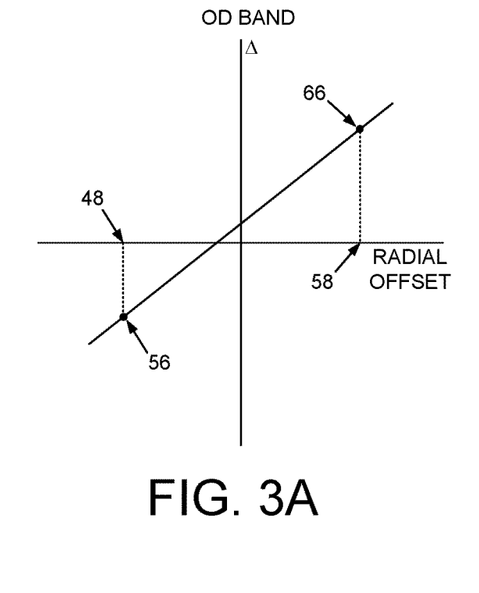
FIGS. 3A-3C show an embodiment wherein a slope of the difference is measured at an outer diameter (OD), middle diameter (MD), and inner diameter (ID) radial position of the head over the disk.
Figure 3B:
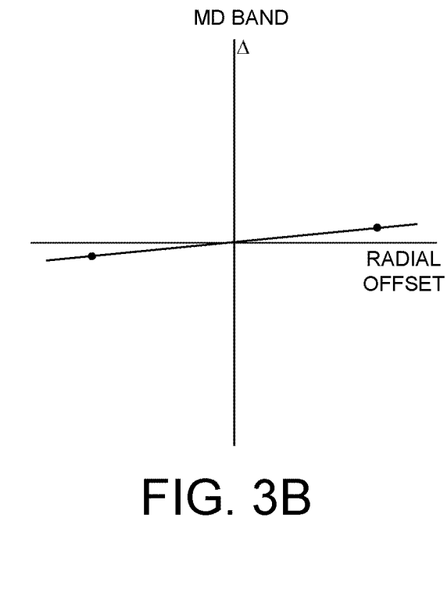
Figure 3C:
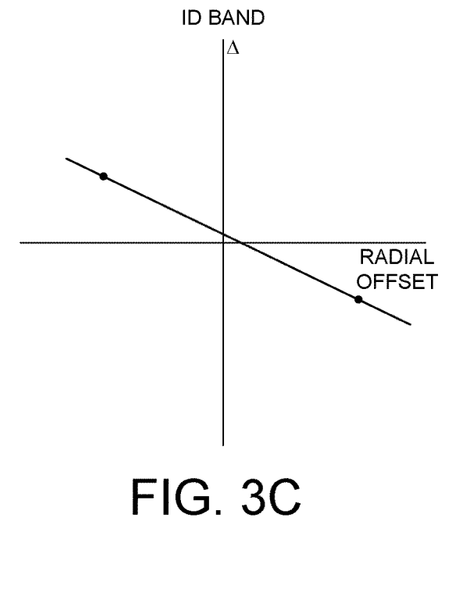

As the head is offset radially from the target data track, the difference between the metrics varies as illustrated in FIG. 3A. Referring again to the OD diameter example of FIG. 2B, as the head moves radially toward the inner diameter of the disk, the second read element $22_2$ reads less of the P2 preamble and so the difference between the metrics increases as shown in FIG. 3A. As the head moves radially toward the outer diameter of the disk, the first read element $22_1$ reads less of the P2 preamble than the second read element $22_2$ and so the difference between the metrics becomes negative. In one embodiment, the difference ($\Delta$) between the metrics varies linearly with the radial offset of the head relative to the target data track as illustrated in FIG. 3A, where the slope of the resulting line depends on the radial offset between the read elements as well as the skew angle of the head (which varies based on the radial position of the head). When the head is over an inner diameter band of data tracks as shown in FIG. 2B, the varying difference ($\Delta$) between the metrics relative to the radial offset of the head is due mainly to the radial offset between the read elements since the skew angle is zero. Accordingly as shown in FIG. 3B, the slope of the difference ($\Delta$) relative to the radial offset of the head decreases as the head moves from the OD toward the MD of the disk. As the head moves further toward the ID of the disk, eventually the slope of the difference ($\Delta$) reaches zero and then becomes negative as shown in FIG. 3C due to the opposite skew angle of the head.

Figure 4A:
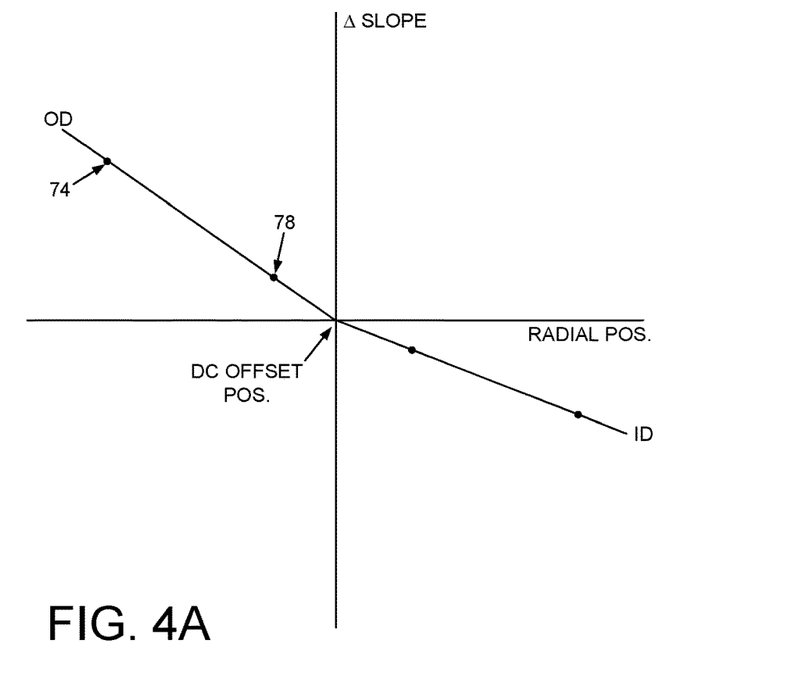
FIG. 4A is a graph representing the slope of the difference across the radius of the disk according to an embodiment.
Figure 4B:
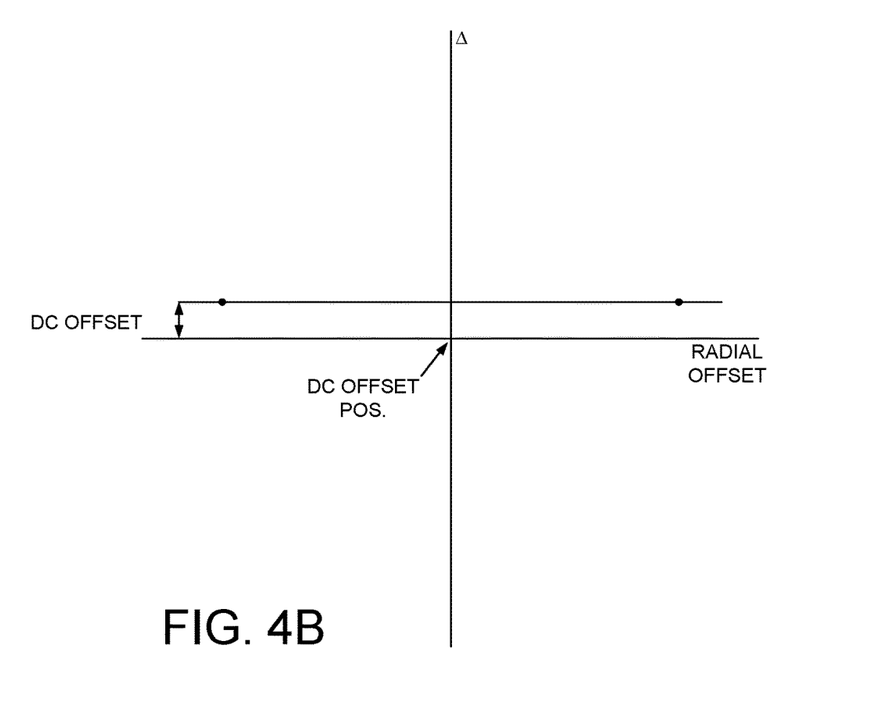
FIG. 4B is a graph showing a DC offset for the difference when the slope of the difference is zero due to a difference in sensitivity between the read elements.

FIG. 4A shows an example of the change in the slope of the difference ($\Delta$) as the head moves from the OD to the ID. In this example, the slope of $\Delta$ changes linearly with the radial position of the head, wherein the linearity is different for the positive slopes as compared to the negative slopes. In other embodiments, the slope of the difference ($\Delta$) may change as a non-linear function of the radial position, such as any suitable polynomial function. At the radial position near the middle diameter of the disk where the slope of the difference ($\Delta$) reaches zero as shown in FIG. 4A, the difference ($\Delta$) between the metrics is also zero if the sensitivity of each read element is the same. However if the sensitivity of read elements is different, then the difference ($\Delta$) between the metrics will be a non-zero DC offset. An example of this is shown in FIG. 4B where the first read element $22_1$ is more sensitive than the second read element $22_2$. Even though both read elements may be reading the same width of the data sector preamble at the radial position of the head where the slope of the difference ($\Delta$) is zero, the metric generated for the first read signal will be higher than the metric generated for the second read signal, thereby resulting in a positive DC offset. If the sensitivity of the second read element $22_2$ were higher than the first read element $22_1$, then at the same radial position the DC offset in the difference ($\Delta$) would be negative. In one embodiment in order to compensate for the error caused by this DC offset, the DC offset is measured at the appropriate radial position of the head, and then subtracted from the difference ($\Delta$) at all radial positions of the head.

Figure 5:
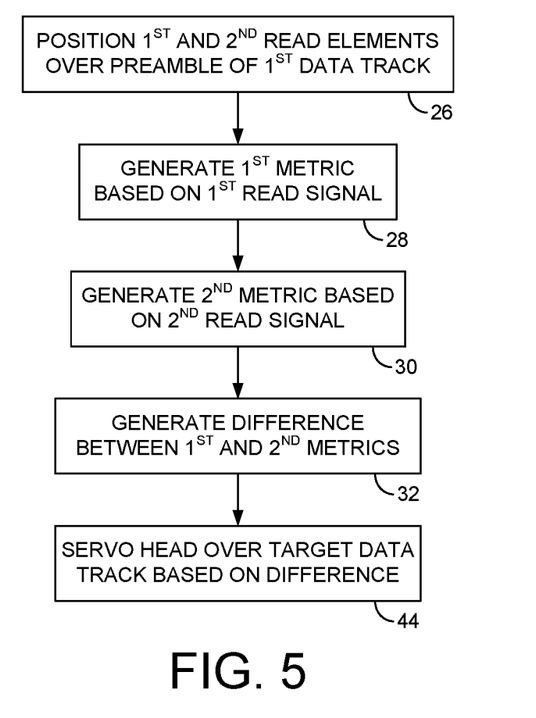
FIG. 5 is a flow diagram according to an embodiment wherein the head is servoed over the disk based on the difference between the metrics.

The difference ($\Delta$) between the metrics generated for each read signal may be used for any suitable purpose. In one embodiment shown in FIG. 5, the difference ($\Delta$) may be used to servo the head over a target data track (block 44). That is, the difference ($\Delta$) between the metrics may represent a position error signal (PES) of the head relative to a target data track, and this PES may be used to augment or replace the PES generated by reading the servo sectors $34_1$-$34_N$. In one embodiment, multiple data sectors are recorded between each servo sector, and therefore the resolution of the PES generated based on the difference ($\Delta$) is higher than the resolution of the PES based on the servo sectors which can improve the servoing performance of the head over the target data track. In another embodiment, servoing the head based on a preamble PES during a read operation may improve the likelihood of successfully recovering the data sectors since the read elements are servoed to follow the actual position of the written data sectors as opposed to following an estimated center of the data track as defined by the servo sectors.

Figure 6A:
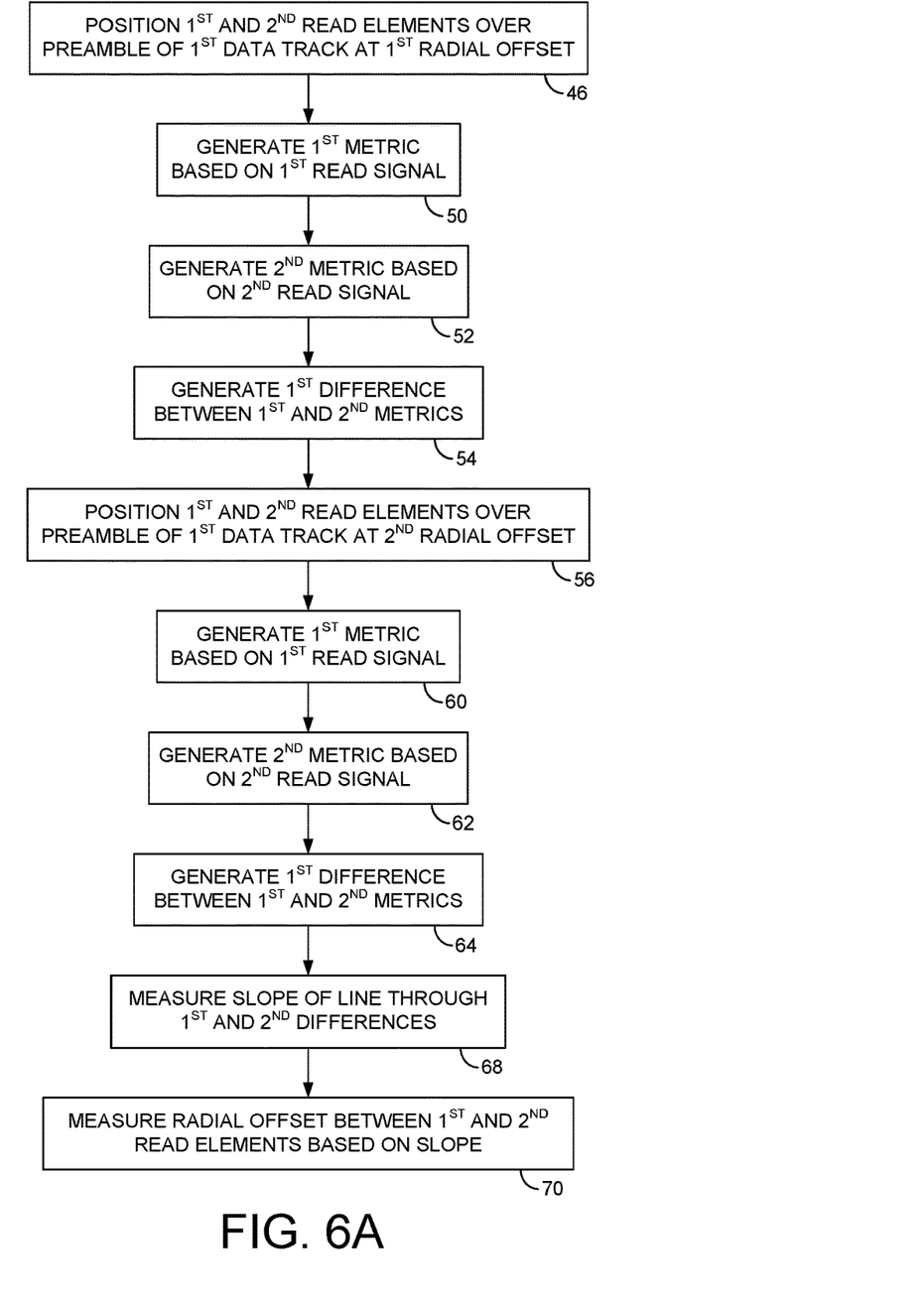
FIG. 6A is a flow diagram according to an embodiment wherein the difference between the metrics is generated at multiple radial positions in order to measure a slope of the difference which is then used to measure a radial offset between the first and second read elements.

In another embodiment, the difference ($\Delta$) may be used to measure the radial offset between the read elements. This embodiment is understood with reference to the flow diagram of FIG. 6A, wherein the first and second read elements are positioned over the preamble of a first data track at a first radial offset from the center of the first data track (block 46). Referring to the example of FIG. 3A, the first read element $22_1$ may be positioned at a first radial offset 48 with respect to the center of a target data track. A first metric is generated based on the first read signal (block 50), and a second metric is generated based on the second read signal (block 52). A difference ($\Delta$) between the first and second metrics is generated (block 54), wherein in the example of FIG. 3A the difference ($\Delta$) 56 may be generated. The first and second read elements are positioned over the preamble of the first data track at a second radial offset from the center of the first data track (block 56). Referring again to the example of FIG. 3A, the first read element $22_1$ may be positioned at a second radial offset 58 with respect to the center of a target data track. A first metric is generated based on the first read signal (block 60), and a second metric is generated based on the second read signal (block 62). A difference ($\Delta$) between the first and second metrics is generated (block 64), wherein in the example of FIG. 3A the difference ($\Delta$) 66 may be generated. A slope of the line is measured through the first and second differences (block 68), such as the slope of the line shown in FIG. 3A. The radial offset between the first read element $22_1$ and the second read element $22_2$ at the target data track is measured based on the slope of the line (block 70).

In one embodiment, other more time consuming techniques may be employed to measure the radial offset between the read elements at a given radial position of the head, such as by writing and reading a test pattern while scanning the read elements radially over the test pattern. The measured radial offset between the read elements using this alternative technique may then be correlated with the slope of the line such as shown in FIG. 3A. This correlation may be generated at different radial positions and corresponding line slopes such as shown in FIGS. 3A-3C. In one embodiment, this correlation may be generated over a subset of disk drives to generate nominal correlations which may then be copied to each production disk drive. In this manner, each production disk drive may utilize the correlation in order to quickly measure the radial offset of the read elements based on the slope of the difference ($\Delta$) such as shown in FIGS. 3A-3C. Again, in one embodiment the slope of the difference ($\Delta$) may be quickly determined by generating the difference ($\Delta$) at two radial offsets from the center of a target data track such as shown in FIG. 3A.

Figure 6B:
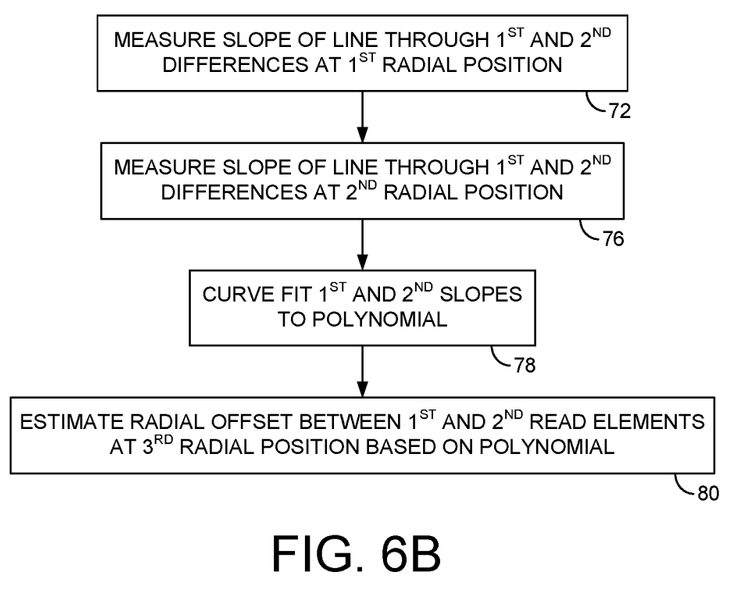
FIG. 6B is a flow diagram according to an embodiment wherein the slope of the difference is measured at multiple radial positions, the measurements are curve fitted to a suitable polynomial, and the polynomial is used to estimate the radial offset between the first and second read elements at any given radial position of the head over the disk.

FIG. 6B is a flow diagram according to an embodiment wherein the slope of the line through two differences ($\Delta$) is measured at a first radial position (block 72). For example, in the embodiment of FIG. 4A the slope 74 of the line through two differences ($\Delta$) may be measured at a first outer diameter position. The slope 78 of the line through two differences ($\Delta$) is also measured at a second radial position (block 76), such as at a second outer diameter position as shown in FIG. 4A. The slopes are then curve fitted to a suitable polynomial (block 78), such as a linear function or non-linear function. In the case of a non-linear function, more than two slope measurements may be taken at multiple radial positions of the head. The radial offset between the read elements may then be estimated for any given radial position of the head (e.g., at a third radial position) based on the polynomial (block 80) (i.e., by estimating the slope of the differences ($\Delta$) at the given radial position of the head). In the embodiment of FIG. 4A, the slope of the differences ($\Delta$) may be presented by a first linear function for the outer diameter to middle diameter of the disk, and by a second linear function for the middle diameter to inner diameter of the disk. The slope of the line for the inner diameter of the disk may be measured by measuring the slope of the differences ($\Delta$) at two inner radial positions of the head. In one embodiment, the radial position where the DC offset is measured as shown in FIG. 4B may be determined based on one or both linear functions shown in FIG. 4A; that is, by determining the radial position where the slope of the differences ($\Delta$) reaches zero.

The measured or estimated radial offset between the read elements at a target data track may be used for any suitable reason. In one embodiment, the radial offset may be used in a two-dimensional (2D) data recover algorithm wherein each read signal may be weighted based on the servoed locations of the read elements relative to a center of a target data track. In another embodiment, the radial offset between the read elements may be used to select a target radial position for each read element relative to the center of a target data track. In yet another embodiment that employs three or more read elements, the radial offset between the read elements may be used to select a subset of the read elements for 2D data recover processing, and/or select a subset of the read elements for servo control.

In other embodiments, the difference ($\Delta$) between the metrics may be used to detect an off-track condition during an access operation (write/read operation) so that the corresponding data sector(s) may be flagged as suspect. For example, when a suspect data sector is detected based on the difference ($\Delta$), the control circuitry may generate and store extended redundancy for the data sector (e.g., store the extended redundancy in a Flash memory). If during a read operation the suspect data sector is unrecoverable using the standard redundancy, the extended redundancy may be processed to recover the data sector. In yet other embodiments, when an excessive difference ($\Delta$) is detected during a write operation, the write operation may be aborted, or a write-verify read may be initiated for the suspect data sector(s) or entire data track. If the write-verify read fails, the data sector(s) or entire data track may be rewritten.

In other embodiments, the preamble PES generated based on the difference ($\Delta$) may be used to generate feed-forward servo compensation values that compensate for repeatable runout (RRO) errors. That is, the preamble PES may be used to augment or replace the servo sector PES when measuring the RRO of the disk in order to generate the corresponding feed-forward servo compensation values. In still another embodiment, the preamble PES may be used to measure a non-repeatable runout (NRRO) of the servo sectors due, for example, to a media defect in a servo sector. The NRRO measurements may be processed to generate NRRO compensation values that are subtracted from the servo sector PES during tracking operations.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
  a disk comprising a plurality of data tracks, wherein:
    each data track comprises a plurality of data sectors;
    each data sector comprises a preamble; and
    the preambles of adjacent data tracks are recorded at different frequencies;
  a head actuated over the disk, wherein the head comprises a plurality of read elements including a first read element and a second read element; and
  control circuitry configured to:
    position the first read element and the second read element over a first preamble of a first data track to generate a first read signal emanating from the first read element and a second read signal emanating from the second read element;
    generate a first metric based on the first read signal and a second metric based on the second read signal; and
    generate a difference between the first metric and the second metric.

2. The data storage device as recited in claim 1, wherein the control circuitry is further configured to:
  generate the first metric by measuring a signal-to-noise ratio (SNR) of the first read signal; and
  generate the second metric by measuring a SNR of the second read signal.

3. The data storage device as recited in claim 2, wherein the control circuitry is further configured to measure the SNR at the frequency of the first preamble.

4. The data storage device as recited in claim 1, wherein the control circuitry is further configured to:
  generate the first metric by measuring an amplitude of a first frequency component of the first read signal; and
  generate the second metric by measuring an amplitude of a second frequency component of the second read signal.

5. The data storage device as recited in claim 4, wherein the first frequency is the same as the second frequency.

6. The data storage device as recited in claim 1, wherein the control circuitry is further configured to servo the head over the first data track based on the difference.

7. The data storage device as recited in claim 1, wherein the control circuitry is further configured to measure a radial offset between the first and second read elements based on the difference.

8. The data storage device as recited in claim 7, wherein the control circuitry is further configured to:
  measure the difference for at least two different radial positions of the head over the first data track;
  generate a first slope of the differences for the first data track; and
  measure the radial offset between the first and second read elements for the first data track based on the first slope.

9. The data storage device as recited in claim 8, wherein the control circuitry is further configured to:
  measure the difference for at least two different radial positions of the head over a second data track;
  generate a second slope of the differences for the second data track; and
  curve fit the first slope and the second slope to a polynomial.

10. The data storage device as recited in claim 9, wherein the control circuitry is further configured to estimate the radial offset between the first read element and the second read element based on the polynomial when the head is over a third data track.

11. A method of operating a data storage device, the method comprising:
  positioning a first read element and a second read element of a head over a first preamble of a first data track on a disk to generate a first read signal emanating from the first read element and a second read signal emanating from the second read element;
  generating a first metric based on the first read signal and a second metric based on the second read signal; and
  generating a difference between the first metric and the second metric.

12. The method as recited in claim 11, further comprising:
  generating the first metric by measuring a signal-to-noise ratio (SNR) of the first read signal; and
  generating the second metric by measuring a SNR of the second read signal.

13. The method as recited in claim 12, further comprising measuring the SNR at a frequency of the first preamble.

14. The method as recited in claim 11, further comprising:
  generating the first metric by measuring an amplitude of a first frequency component of the first read signal; and
  generating the second metric by measuring an amplitude of a second frequency component of the second read signal.

15. The method as recited in claim 14, wherein the first frequency is the same as the second frequency.

16. The method as recited in claim 11, further comprising servoing the head over the first data track based on the difference.

17. The method as recited in claim 11, further comprising measuring a radial offset between the first and second read elements based on the difference.

18. The method as recited in claim 17, further comprising:
  measuring the difference for at least two different radial positions of the head over the first data track;
  generating a first slope of the differences for the first data track; and
  measuring the radial offset between the first and second read elements for the first data track based on the first slope.

19. The method as recited in claim 18, further comprising:
  measuring the difference for at least two different radial positions of the head over a second data track;
  generating a second slope of the differences for the second data track; and
  curve fitting the first slope and the second slope to a polynomial.

20. The method as recited in claim 19, further comprising estimating the radial offset between the first read element and the second read element based on the polynomial when the head is over a third data track.

* * * * *